United States Patent

[11] 3,573,605

[72] Inventors Harry P. Hart
Whippany;
Robert J. Kakalec, Madison, N.J.
[21] Appl. No. 856,121
[22] Filed Sept. 8, 1969
[45] Patented Apr. 6, 1971
[73] Assignee Bell Telephone Laboratories, Incorporated
Murray Hill, Berkeley Heights, N.J.
Continuation-in-part of application Ser. No.
763,882, Sept. 30, 1968, now abandoned.

[54] CLOSED LOOP FERRORESONANT REGULATOR
14 Claims, 6 Drawing Figs.
[52] U.S. Cl. .................................................... 323/56,
321/25, 323/60
[51] Int. Cl. .................................................... G05f 1/46,
G05f 1/64
[50] Field of Search .......................................... 323/48, 50,
56, 57, 60, 61, 86—88, 89; 321/16, 18, 25

[56] References Cited
UNITED STATES PATENTS
| | | | |
|---|---|---|---|
| 2,734,164 | 2/1956 | Knowlton .................... | 323/56 |
| 3,079,546 | 2/1963 | Kuba ............................ | 323/50 |
| 3,183,429 | 5/1965 | Baycura et al. ............... | 323/56X |

*Primary Examiner*—J. D. Miller
*Assistant Examiner*—A. D. Pellinen
*Attorneys*—R. J. Guenther and E. W. Adams, Jr.

ABSTRACT: The transformer core of a ferroresonant regulator includes a main core portion on which is wound the output winding, a control portion on which is wound a compound winding, and a saturating portion. The magnetic flux in the main core portion divides, part into the control portion and part into the saturating portion. The output voltage is controlled without saturation of the main core portion by a low current in the compound winding. An integrating circuit including an integrating capacitor is coupled to the output winding to develop a voltage proportional to the volt-time integral of the output voltage. A switch responsive to the integrating capacitor voltage causes current to flow in the compound winding. The current through the compound winding opposes saturation of the control core portion and precipitates saturation of the saturating core portion to limit the total flux swing in the main core portion and the half cyclic average of output voltage. The operation of the switch in conjunction with the saturation of the saturating core portion causes the ferrocapacitor to reverse its charge each half cycle, and ferroresonant regulation is maintained. The output voltage may be varied by varying the rate of charge of the integrating capacitor, and closed loop regulation may be achieved by adding a feedback network responsive to the load voltage for varying the charging rate.

INVENTORS H.P. HART
R.J. KAKALEC
BY
John P. McDonnell
ATTORNEY

CLOSED LOOP FERRORESONANT REGULATOR

CROSS-REFERENCE TO RELATED APPLICATION

This application is a continuation-in-part of our copending application Ser. No. 763,882, filed Sept. 30, 1968, now abandoned.

BACKGROUND OF THE INVENTION

This invention relates to ferroresonant voltage regulating circuits and particularly to those with adjustable output voltage or closed feedback loops.

Ferroresonant voltage regulators have been used to advantage for more than 2 decades. They include basically a linear inductor, a saturating inductor, and a capacitor. The linear inductor is in series with the input line to the voltage regulator and the saturating inductor shunts the output. The capacitor, often called a ferroresonating capacitor, or more simply a ferrocapacitor, shunts the saturating inductor and is usually tuned near resonance with the linear inductance. Alternatively, the two inductors may be wound upon a single transformer core and the input and output electrically isolated. In that case, the input winding is on a nonsaturating portion of the transformer core and the output winding is on a saturating portion. With either construction, in each half cycle of AC input the saturating core saturates, and the impedance of the saturating winding drops. The capacitor resonates with the low saturated inductance to quickly discharge through the saturating winding and recharge in the opposite polarity. The core thereupon drops out of saturation so that further ringing does not occur. The AC output, which may be rectified to provide DC output, is taken from across the ferrocapacitor. When the ferrocapacitor voltage reverses, therefore, the output voltage reverses, and the output half cycle is terminated. A saturating core, however, requires a fixed volt-time area of its saturating winding characteristic in order to saturate. Consequently, when the input voltage increases or decreases, the core saturates earlier or later in the immediate half cycle, but the volt-time product of each half cycle of output voltage is constant. When the input frequency is constant, therefore, providing a constant steady state and average time period per output half cycle, the output voltage must be constant. As a result, changes in input voltage have little effect on output voltage and regulation against changes in input voltage is obtained thereby.

The advantages of these prior art circuits are well known. They may be made very efficient, simple and reliable; they provide good output voltage regulation with changes in line voltage, input noise suppression, inherent output short circuit protection, good input power factor, and a relatively square output waveform which is particularly well suited for rectifying and filtering.

These ferroresonant circuits are, however, subject to several disadvantages. The idealized expression for average induced output voltage is generally given as $E_{out}=4ANFB_{Sat} \times 10^{-8}$ where $A$ is the cross section area of the saturating core, $N$ is the number of turns in the output winding, $F$ is the frequency, and $B_{Sat}$ is the flux density required to saturate the core. As can be seen from the foregoing equation, the output voltage of a ferroresonant regulator is particularly sensitive to input supply frequency changes. In addition, since the equation represents induced output voltage, voltage drops in the output circuit due to output current are not compensated for, and output terminal voltage is not regulated for changes in load. Furthermore, since the output voltage depends upon specific core properties and dimensions, the core manufacturing tolerances directly affect output voltage tolerances. Finally, ferroresonant transformers generate high external magnetic fields because of the saturated cores, particularly at light loads when the core is driven deeper into saturation.

It has not heretofore proved a simple task to add output voltage regulation with load and frequency to a ferroresonant circuit without destroying or duplicating the ferroresonant function because the physical characteristics of the saturable core itself largely determine the regulation. Approaches which short-out a winding on the main core at a variable time in the input cycle to attain regulation destroy ferroresonant action by preventing core saturation and discharging the ferrocapacitor. The ferroresonant regulation deteriorates into pulse width modulated switching regulation, which gives an output wave inherently difficult to filter when rectified. Approaches which add a variable impedance series regulator in series with a ferroresonant regulator wastefully duplicate the ferroresonant function of output regulation with input variations.

An object of this invention is, therefore, to add efficiently output voltage regulation with load and frequency variations to the basic ferroresonant regulating action.

Another object is to integrate closed loop feedback into a ferroresonant circuit.

Still another object is to provide ferroresonant type voltage regulation without the usual high level magnetic field surrounding the transformer.

SUMMARY OF THE INVENTION

In the present invention, variable output voltage and closed loop regulation are added to a transformer ferroresonant voltage regulator by precipitating saturation of a small core portion, rather than the entire transformer core, to determine the time in the cycle when the charge on the ferrocapacitor is reversed. The small core portion may comprise a single outer leg or a pair of saturating shunts. An integrating circuit including an integrating capacitor is coupled to the secondary winding to develop a voltage proportional to the volt-time integral of the voltage across the ferrocapacitor. A switch operates in response to a predetermined voltage across the integrating capacitor to cause current to flow in a low power compound winding. The switch may connect the compound winding in series with a saturating winding to a source of voltage in phase with the ferrocapacitor voltage, or it may cause induced current to flow by merely shorting the compound winding. The resulting compound winding current generates core flux that opposes the existing flux linking the compound winding to force the small core portion to saturate Once the core portion has saturated, the main flux which links the output winding is restricted, causing termination of the half cycle and reversal of the charge on the ferrocapacitor. Ferroresonant regulation is thereby provided with only a small portion of the transformer core saturating and only a small amount of current through the switch. Both the electronic switch and the transformer are thereby made more efficient and less expensive. With this novel structure, saturation of the core portion and termination of the half cycle is thus precipitated to set the volt-time integral of each half cycle of output waveform when the charge on the integrating capacitor reaches the predetermined value. Therefore, output voltage may be varied by varying the charging rate of the integrating capacitor. Closed loop regulation may then be added by a feedback network responsive to the load voltage for varying the charging rate of the integrating capacitor. A high degree of regulation of voltage with changing input voltage and frequency and changing load is thereby obtained very simply, inexpensively and efficiently.

DETAILED DESCRIPTION

Figure 1:
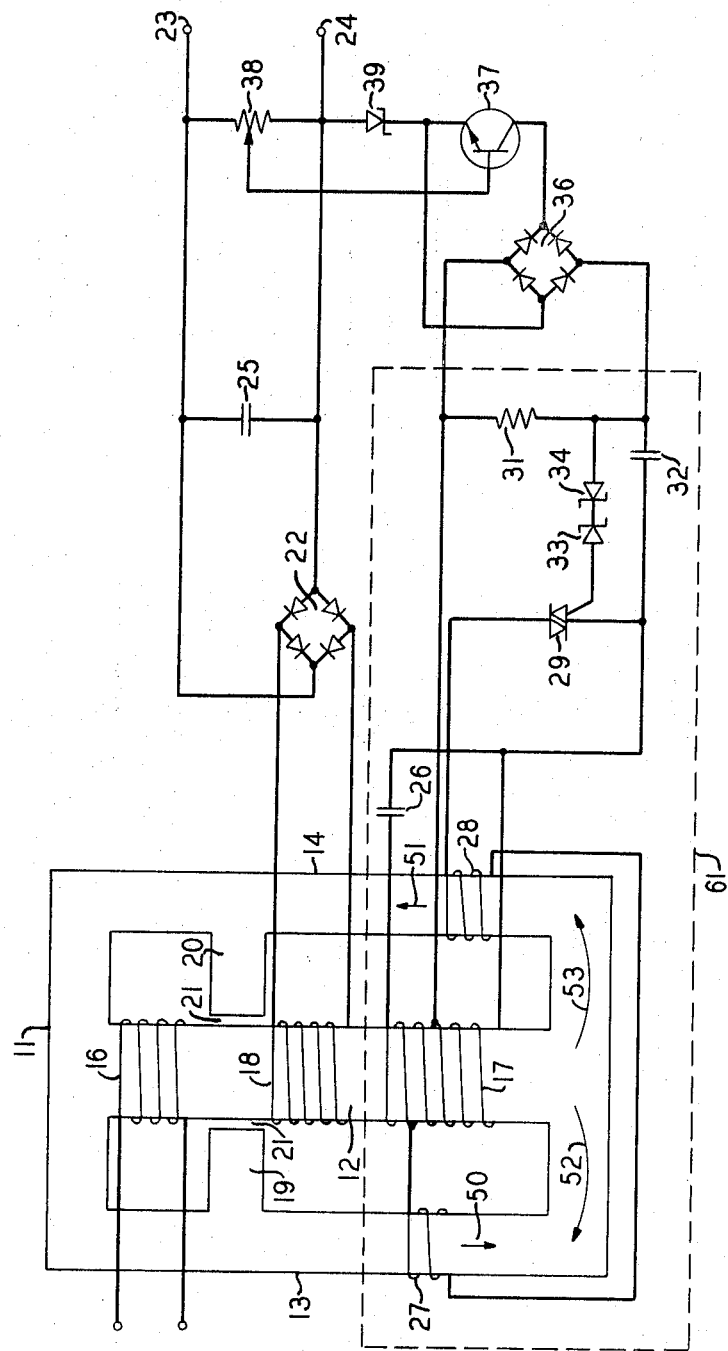
FIG. 1 is a schematic diagram of an embodiment of the invention.

In the circuit of FIG. 1, a transformer 11 has a center leg 12, and two outer legs 13 and 14. On center leg 12 there is wound a primary winding 16, a secondary winding 17 and a third winding 18. Magnetic shunts 19 and 20 including airgaps 21 separate the primary winding from the other two windings to provide a path for leakage flux, and thereby to reduce the primary-secondary coupling in the manner common in ferroresonant circuits.

The AC terminals of a full-wave bridge rectifier 22 are connected across winding 18, and a pair of DC output terminals 23 and 24 are connected to the DC terminals of bridge 22. A filter capacitor 25 is connected across the output terminals. A ferrocapacitor 26 is connected across secondary winding 17; a pair of compound windings 27 and 28 on outer legs 13 and 14, respectively, are connected in series-aiding relationship in series with triac 29, across a portion of secondary winding 17.

Triac 29 is a three-terminal bilateral triode switch which is capable of passing current in either direction in response to the application of a relatively low-current low-voltage pulse between its gate and cathode terminals. Such a switch is described in detail at pages 142 through 148, 245 and 279 of the text "Semiconductor Controlled Rectifiers: Principles and Applications of P-N-P-N Devices" by F. E. Gentry et al., copyright 1964. Obviously, the invention is not limited to the use of such devices, however, as any equivalent device or combination of devices could be substituted therefor.

An integrating circuit comprising the series combination of a resistor 31 and an integrating capacitor 32 is connected across another portion of winding 17. A pair of Zener diodes 33 and 34, connected in series and poled in opposite directions, connects the junction of capacitor 32 and resistor 31 to the gate electrode of triac 29. The AC terminals of a full-wave bridge rectifier 36 are connected across resistor 31. The DC terminals of bridge 36 are connected across the emitter-collector path of a transistor 37. Potentiometer 38 is connected across output terminals 23 and 24, its tap being connected to the base of transistor 37. Finally, a Zener diode 39 is connected between output terminal 24 and the emitter electrode of transistor 37.

If triac 29 is disabled so that compound windings 27 and 28 are held open, the circuit performs in a typical ferroresonant manner. In each half cycle the entire portion of the transformer core below magnetic shunts 19 and 20 saturates at a fixed volt-time integral of voltage on winding 17. Ferrocapacitor 26 resonates with the low saturated inductance of winding 17, and discharges and recharges in the opposite polarity, the capacitor current flowing through winding 17. Further ringing is prevented because the core drops out of saturation and the higher inductance is restored to winding 17. If the voltage on primary winding 16 increases, the core saturates earlier to terminate the immediate half cycle, and the average output voltage remains constant as discussed before. The magnetic shunt 19 provides a path for excess primary flux which does not link the secondary and third windings to allow their voltages to remain constant while the input voltage varies. Since output winding 18 is closely coupled to winding 17, their respective voltages remain in phase and in proportion. The DC output voltage at terminal 23 and 24 is therefore regulated with changes in input voltage.

Figure 2:
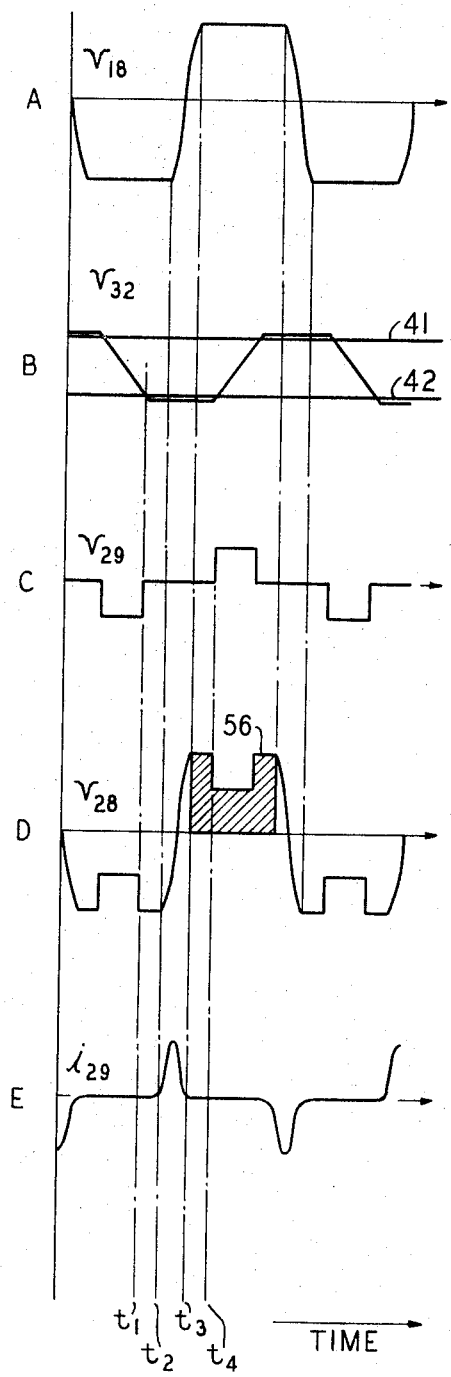
FIGS. 2 and 3 are plots of various voltages against a common time abscissa which are helpful in explaining the operation of the embodiment of FIG. 1.

The operation of the compound windings, the triac and the integrating circuit may be better understood with reference to the curves of FIG. 2; waveform A is the voltage across output winding 18; waveform B is the voltage across integrating capacitor 32; waveform C is the voltage across triac 29; waveform D is the voltage across compound winding 28; and waveform E is the current through triac 29. All of the waveforms are plotted against a common time abscissa.

Since the integrating circuit which comprises resistor 31 and capacitor 32 is connected across a portion of winding 17, the voltage across integrating capacitor 32 is proportional to the volt-time integral of the voltage across winding 18. As can be seen in FIG. 2, waveform B, this is an alternating voltage of trapezoidal waveform. Intersecting waveform B are shown the reverse breakdown potentials, 41 and 42, of the Zener diodes 33 and 34, respectively. When the integrating capacitor voltage reaches the breakdown potential of the Zener diode that is currently back-biased, triac 29 fires to connect compound windings 27 and 28 across a portion of winding 17. This occurs at time $t_1$ in FIG. 2, while the flux in the transformer core is uniformly increasing. Any source of AC voltage in phase with that on winding 17 may be used, but voltage from taps on winding 17 are convenient. As can be seen from waveforms C and D, when the triac fires, its potential drops to almost zero and the voltage across compound winding 28 jumps to its maximum value. Because windings 27 and 28 are series aiding, the triac current produces an increment of flux which is directed down in one winding and up in the other. These directions are illustrated in FIG. 1 by arrows 50 and 51, respectively. The main magnetic flux in the center leg 12 splits into legs 13 and 14, as shown by arrows 52 and 53, respectively. The flux due to compound winding 28 therefore, aids the main flux, and that due to compound winding 27 opposes the main flux. As a consequence, when triac 29 is fired, the saturation of leg 14 is speeded up and that of leg 13 is prevented. The decrease of flux in center leg 12 due to winding 27, however, is balanced by the increase due to winding 28, and the voltage across winding 17 remains unaffected. The flux in leg 14 continues to increase to saturation at time $t_2$, after which it cannot increase. At this point, the impedance of winding 28 drops, and the increment of flux due to the triac current in winding 27 increases. Since that increment is no longer opposed by an increment from winding 28, it causes the heretofore steadily increasing flux in center leg 12 to stop increasing, and the impedance of winding 17 to drop. Ferrocapacitor 26 thereupon discharges primarily through winding 17, and recharges in opposite polarity in typical ferroresonant fashion. The discharge of ferrocapacitor 26 starts at time $t_2$ and the recharge continues until time $t_3$. Triac 29 continues to conduct through windings 27 and 28 until it is able to turn itself off at time $t_4$. Its voltage then immediately rises to reflect the voltage across winding 17.

The time in the cycle when core 14 saturates, therefore, determines the time in the cycle when ferrocapacitor 26 reverses its charge and therefore determines the output voltage, just as the core dimensions of a typical ferroresonant transformer determines the time its ferrocapacitor reverses its charge and determines its output voltage. If the reversal occurs earlier in the cycle, output voltage is reduced, and vice versa. Since transformer leg 14 requires a fixed volt-time area to saturate if triac 29 fires at a fixed volt-time integral, a constant voltage is maintained at the output of winding 18 with changing input conditions. The circuit of the invention therefore performs with all the advantages of a typical ferroresonant regulator, but only a portion of the transformer core saturates. As a consequence, core losses are considerably less and the external magnetic field is greatly reduced; this provides much improved efficiency at light loads.

Figure 3:
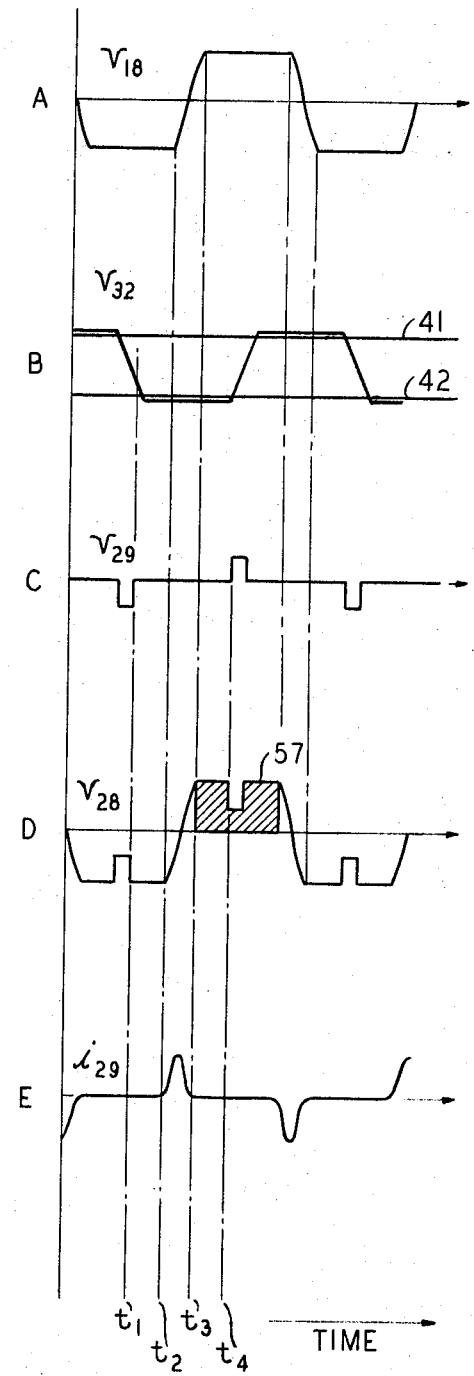

A major advantage of providing adjustable output voltage may be obtained in addition to the foregoing advantages if the integrating resistance is made variable. The waveforms of FIG. 3, which represent voltages and currents observed at the same circuit points of the corresponding waveforms of FIG. 2, illustrate the performance when integrating resistor 31 is reduced in value. It will be noted that the triac fires earlier in the cycle at time $t_1$. Time $t_2$ has not changed position because frequency must remain that of the driving source applied to primary winding 16, and the saturation of core 28 determines the end of each half cycle. The shaded areas under the waveforms D in FIGS. 2 and 3 represent the volt-time integral of winding 28. Since a fixed volt-time integral is required to saturate core leg 14, the shaded area under curve in FIG. 3 must equal that under curve in FIG. 2. With a smaller cutout of the shaded area in FIG. 3 due to voltage across the triac, the two areas can only be the same if the amplitude of the waveform D of FIG. 3 is lower. Thus a lower value of integrating resistance provides a lower output voltage.

The purpose of bridge rectifier 36, transistor 37, Zener diode 39 and potentiometer 38 is to vary the effective integrating resistance as a function of output voltage and thereby to provide closed loop feedback regulation. The AC voltage appearing across resistor 31 is rectified by bridge 36 and appears across the collector-emitter path of transistor 37. Zener diode 39 holds the emitter to a constant reference voltage. Changes in output voltage appearing across terminals 23 and 24 appear also, in proportion according to the setting of the tap of potentiometer 38, on the base of transistor 37 to vary the transistor's bias. As the bias is thus varied, because of a change in output terminal voltage, the conductivity of the collector-emitter path which shunts resistor 31 is varied, and therefore the integrating resistance.

The feedback circuit operates to compensate for changes in load and frequency as follows: when the terminal output voltage tends to increase because of a decrease in load or increase in frequency or input voltage, the positive bias on transistor 37 is increased to make the transistor more conductive. With a more conductive shunt across resistor 31, the total integrating resistance is reduced, and integrating capacitor 32 charges more quickly. As a consequence, triac 29 is fired earlier in the half cycle. As discussed heretofore, as the triac is fired earlier in the half cycle, less voltage is imparted to the output in the half cycle, and the output voltage tends to drop again.

Thus, closed loop feedback has been added to ferroresonant type operation to provide very close regulation of output voltage with changing load as well as line conditions. What is perhaps more important, however, is the simplicity and the efficiency with which it is accomplished according to the teachings of this invention. It was noted before that only a portion of the core is driven into saturation to control the entire flux. It should be further noted that the current in the compound windings does not control the total flux, but merely an increment which, when added to the main flux, is sufficient to control the saturation time. In addition, when the charge on the ferrocapacitor is reversed as a result of the saturation of core leg 14, the capacitor current flows through winding 17 rather than through the compound windings and triac 29. As a consequence, a small triac current may be used to control a large output current. In a regulator constructed as herein described from which the output is 50 volts regulated to ±1 percent from 0 to 100 amperes, the triac current is less than 10 amperes, and the full load efficiency approximately 90 percent. The regulator is truly low cost, simple and efficient.

The numbers of turns in the portion of winding 17 that is connected across the integrating circuit and the portion that is switched across the compound windings are not critical. Each is chosen with proper regard for the ratings of the component and the voltages required to fire the triac and to reverse the ferrocapacitor charge respectively.

Figure 4:
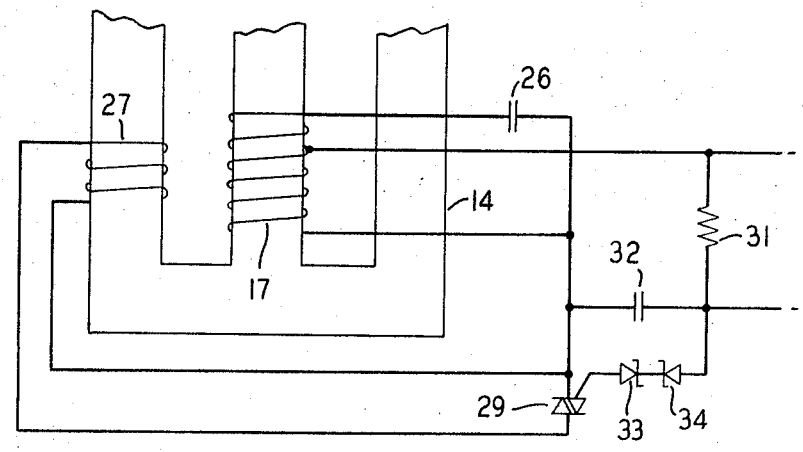
FIG. 4 is a schematic diagram of a circuit that may be substituted for the portion of the embodiment of FIG. 1 within the dotted box to eliminate a compound winding.

The circuit of FIG. 4, which may be substituted for that part of FIG. 1 that lies within the dotted rectangle 61, is an alternative arrangement that eliminates one compound winding without jeopardizing the performance of the regulator. In this case, triac 29 is connected directly across compound winding 27 and serves to short the compound winding instead of connecting it to a voltage source. Transformer leg 14 still saturates each half cycle, however, and the waveforms of FIGS. 2 and 3 still apply. Just before time $t_1$, the voltage across winding 18 is steady and the magnetic flux in all three transformer legs is steadily increasing. At time $t_1$, the voltage across integrating capacitor 32 having exceeded the breakdown voltage of the Zener diode pair 33, 34, triac 29 fires to short circuit winding 27. The short circuit causes a circulating current that virtually prevents the flux in leg 13 from continuing to increase. The flux in center leg 12, however, continues to increase at its previous rate, and the voltage across winding 18 remains steady. The flux in leg 13 being clamped, the rate of increase of flux in leg 14 is doubled in order to support the continued increase in center leg flux. As a consequence, leg 14 saturates at time $t_2$, further increase in the flux in center leg 12 is prevented, and the ferrocapacitor reverses its charge through winding 17 as in the embodiment of FIG. 1.

The DC path through transistor 37 and bridge 36 requires isolation between the error detecting potentiometer 38 and the integrating resistor 31. Consequently, both may not be connected across the same winding. Ferrocapacitor 26, however, may be connected across either winding 17 or 18, or even a third winding closely coupled thereto.

Since the function of Zener diode 39 is to provide a reference voltage in the bias circuit of transistor 37, it may be placed in series with the base of the transistor. The main consideration is the amount of current through the Zener diode needed to sustain breakdown. In addition, a resistor may be connected between the anode of diode 39 and terminal 23 for thermal stability.

Figure 5:
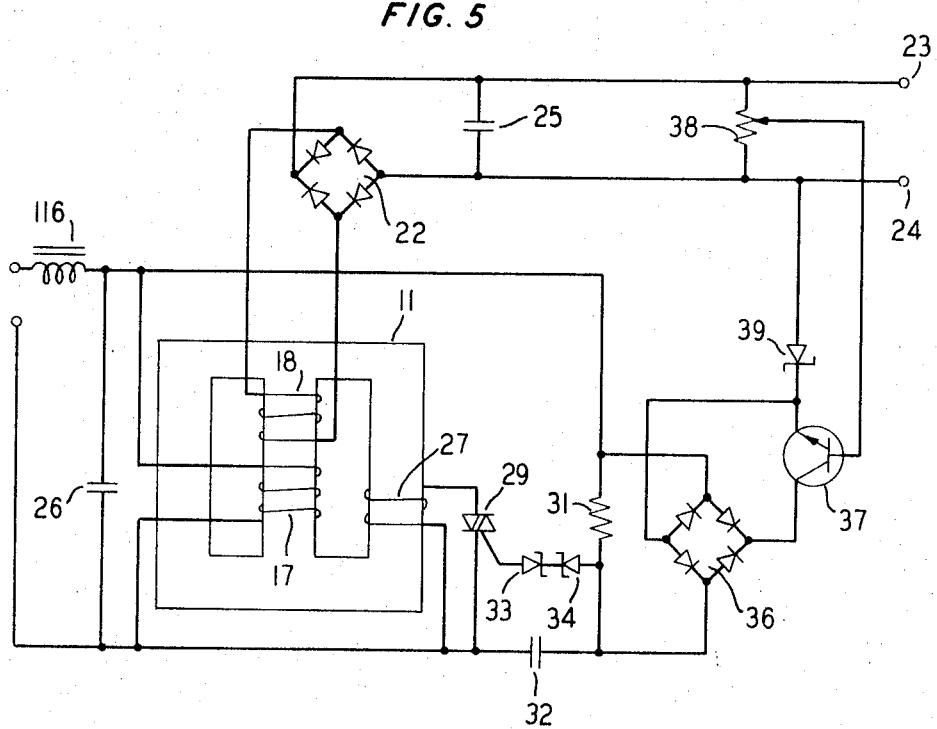
FIG. 5 is a schematic diagram of an additional embodiment of the invention.
Figure 6:
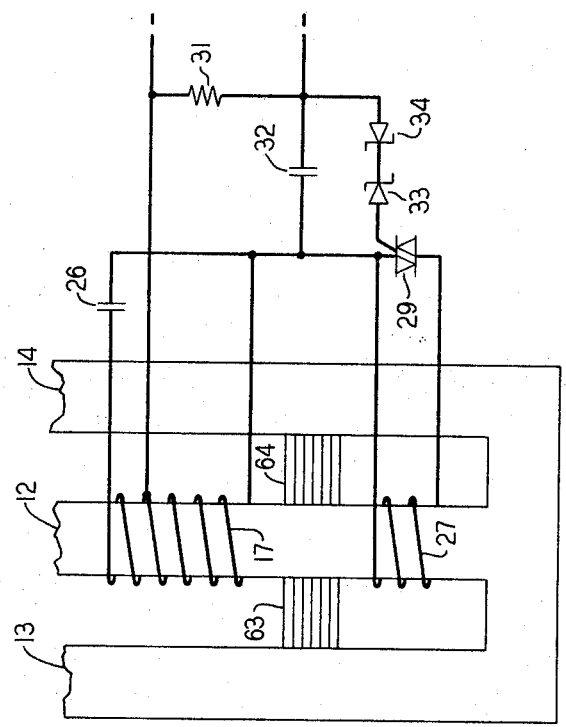
FIG. 6 is a schematic diagram of a circuit that may alternatively be substituted for that portion of the embodiment of FIG. 1 within the dotted box to form a particularly useful embodiment.

A particularly advantageous embodiment of the invention that utilizes only one compound winding is illustrated in FIG. 6. The circuit of FIG. 6 also may be substituted for that part of FIG. 1 that lies within the dotted rectangle 61. Here compound winding 27 has been wound on the center leg rather than on an outer leg as in the circuits of FIGS. 1, 4 and 5. Extending from center leg 12 to outer legs 13 and 14 between compound winding 27 and output winding 18 are a pair of laminated saturating magnetic shunts 63 and 64, respectively. Just before triac 29 fires, the voltage on winding 18 is steady, and the magnetic flux in the transformer legs is linearly increasing. When triac 29 fires, it short circuits compound winding 27 to prevent any further change in the flux in the portion of center leg 12 that extends through winding 27. Any continued increase in flux in leg 12 through windings 17 and 18 is forced to pass through shunts 63 and 64. These shunts quickly saturate, however, to prevent any further increase in flux in center leg 12, and the ferrocapacitor reverses its charge through winding 17 as in the previous embodiments.

The embodiment of FIG. 6 has two major advantages over that of FIG. 4. The first is a saving of space. In the embodiment of FIG. 4, because the compound winding 27 is wound on an outer leg, there must be space allotted between outer leg 13 and center leg 12 to accommodate this winding. Since the embodiments of FIG. 4 and FIG. 6 eliminate winding 28 of FIG. 1, however, there is no winding in the corresponding position on leg 14. As a result, if the core of the transformer is made symmetrical there will be unused space between legs 12 and 14 opposite winding 27. In the alternative, if the transformer core is not symmetrical, there will be unused space between legs 12 and 13 above winding 27. The embodiment of FIG. 6 allows the space between outer and center core legs to be just enough to accommodate the windings on the center leg with no open wasted space. The transformer may therefore be made more compact. Since the transformer occupies most of the space of the entire regulator circuit, the overall space saving is significant.

The second advantage of the embodiment of FIG. 6 lies in the techniques of construction. A small airgap can greatly increase the driving magnetomotive force required to saturate a core section. To prevent any unwanted airgap a core such as that of FIG. 4 is normally assembled in layers each containing an E- and an I-shaped lamination with the joint between them staggered in successive layers. Such interleaving of laminations is expensive. With a core such as that of FIG. 6, however, all of the windings are on one leg and a minute airgap is not critical. The core can therefore be constructed of stacks of laminations without interleaving, resulting in considerable cost savings.

Finally, a further advantage of the embodiment of FIG. 6 is that the total volume of saturating shunts 63 and 64 is considerably less than that of core leg 14. With less saturating iron the circuit is electrically more efficient.

It will also be recognized by those skilled in the transformer art that the embodiment of FIGS. 4 and 6 may be constructed in the two-core form shown in FIG. 5. In place of primary winding 16 of FIG. 1, there is a linear inductor 116 in series with the AC source and winding 17. As in FIG. 1, the ferrocapacitor 26 is connected across winding 17. The remaining components bear the same numbers and are connected in the same manner as shown in FIGS. 1 and 4.

It is to be understood that the above-described arrangements are illustrative of the application of the principles of the invention. Numerous other arrangements may be devised by those skilled in the art without departing from the spirit and scope of the invention.

We claim:

1. Voltage regulating apparatus comprising a transformer having a magnetic core, primary, secondary, and compound windings wound on said core, said core providing a path for magnetic flux linking said primary, secondary, and compound windings, nonsaturating flux shunting means disposed between said primary and secondary windings to shunt a portion of said magnetic flux from said primary winding, and saturating flux shunting means disposed between said secondary and compound windings for providing an alternate path for said magnetic flux shunting said compound winding, a ferrocapacitor connected across said secondary winding, an AC voltage source connected to said primary winding, a load coupled to said secondary winding, an integrating circuit including an integrating capacitor coupled to said secondary winding for developing a voltage proportional to the volt-time integral of the voltage across said ferrocapacitor, and switching means serially connected with said compound winding and to said integrating capacitor for completing a current path through said compound winding in response to a predetermined voltage across said integrating capacitor to limit the flux linking said compound winding and cause said saturating flux shunting means to saturate, whereby the charge on said ferrocapacitor is caused to reverse.

2. Voltage regulating apparatus as in claim 1 wherein said transformer core has three legs, said primary and secondary windings are wound on the center leg of said three legs, said compound winding is wound on one outer leg and said saturating flux shunting means comprises the other outer leg of said three core legs.

3. Voltage regulating apparatus as in claim 2 including a saturating winding connected in series with said compound winding and wound upon said other outer leg, and a source of auxiliary voltage in phase with the voltage across said ferrocapacitor wherein said switching means connects said compound winding, said saturating winding and said auxiliary voltage source in series in response to the voltage across said integrating capacitor.

4. Voltage regulating apparatus as in claim 3 wherein said source of auxiliary voltage is a portion of said secondary winding.

5. Voltage regulating apparatus as in claim 1 wherein said transformer core includes three legs, said primary, secondary and compound windings are wound on the center leg of said three legs, and said saturating flux shunting means is disposed between said secondary and said compound windings and extends from said center leg to said outer legs of said three legs.

6. Voltage regulating apparatus as in claim 5 wherein said switching means short circuits said compound winding in response to a predetermined voltage across said integrating capacitor.

7. Voltage regulating apparatus as in claim 6 wherein said switching means comprises an AC semiconductor switch having a conducting path connected in series with said compound winding and a gating path connected across said integrating capacitor.

8. Voltage regulating apparatus as in claim 6 including a fourth winding on said center leg closely coupled to said secondary winding wherein said load is connected across said fourth winding.

9. Voltage regulating apparatus as in claim 6 including feedback means responsive to the voltage across said load connected to said integrating capacitor and said load to vary the charging rate of said integrating capacitor.

10. Voltage regulating apparatus as in claim 9 wherein said integrating circuit includes an integrating resistor, and said feedback means comprises an error detector connected across said load for producing an error voltage proportional to the difference between the voltage across said load and a reference voltage, a full-wave bridge rectifier having a pair of AC terminals connected across said integrating resistor and a pair of DC terminals, and unidirectional conductive means responsive to said error voltage connected across said DC terminals.

11. A ferroresonant voltage regulating circuit for regulating the voltage at which current is delivered to a load from an alternating current source comprising a first inductance connected in series with said source, a second inductance coupled to said first inductance and connected across said load, said second inductance having a core comprising a saturating portion and a nonsaturating portion, a ferrocapacitor coupled to said second inductance, an integrating circuit including an integrating capacitor coupled to said second inductance for developing a voltage proportional to the volt-time integral of the voltage across said ferrocapacitor, a third inductance coupled to said second inductance by said nonsaturating core portion, and switching means connected to said integrating capacitor and said third inductance for completing a current path through said third inductance to cause said saturating core portion to saturate and the charge on said ferrocapacitor to reverse in response to a predetermined voltage across said integrating capacitor.

12. A ferroresonant voltage regulating circuit as in claim 11 wherein said second inductance is connected in series with said first inductance across said source.

13. Voltage regulating apparatus as in claim 11 including feedback means responsive to the voltage across said load connected to said integrating capacitor and said load to vary the charging rate of said integrating capacitor.

14. Voltage regulating apparatus as in claim 11 wherein said integrating circuit includes an integrating resistor and said feedback means comprises an error detector connected across said load for producing an error voltage proportional to the difference between the voltage across said load and a reference voltage, a full-wave bridge rectifier having a pair of AC terminals connected across said integrating resistor and a pair of DC terminals, and unidirectional conductive means responsive to said error voltage connected across said DC terminals.